United States Patent [19]
Fan

[11] Patent Number: 6,118,663
[45] Date of Patent: Sep. 12, 2000

[54] MULTI-CONFIGURATION MODULAR COMPUTER

[76] Inventor: Yu-Han Fan, 11F.-1, No. 83, Sec. 1, Nan Kan Rd., Luchu Hsiang, Taoyuan Hsien, Taiwan

[21] Appl. No.: 09/097,303

[22] Filed: Jun. 12, 1998

[51] Int. Cl.⁷ .............................. H05K 5/00; H05K 7/00; H05K 5/04; A47B 81/00; A47B 97/00
[52] U.S. Cl. ...................... 361/725; 361/680; 361/681; 361/683; 361/686; 361/728; 361/729; 361/731; 361/784; 312/223.1; 312/223.2
[58] Field of Search ..................................... 361/728, 729, 361/731, 680, 681, 683, 686, 784; 312/223.1, 223.2

[56] References Cited

U.S. PATENT DOCUMENTS 5,575,686 11/1996 Noschese .................................. 439/620
5,805,415 9/1998 Tran et al. .............................. 361/681
5,838,548 11/1998 Matz et al. .............................. 361/784
6,008,985 12/1999 Lake et al. .............................. 361/686
6,052,279 4/2000 Friend et al. ........................... 361/686

*Primary Examiner*—Leo P. Picard
*Assistant Examiner*—Tung Minh Bui
*Attorney, Agent, or Firm*—Kolisch Hartwell Dickinson McCormack & Heuser

[57] ABSTRACT

A multi-configuration modular computer that can be configured to be different types of personal computers or associated computer devices is disclosed. The multi-configuration modular computer comprises a display module, a keyboard and pointer device module, a motherboard and power module, and an expansion module. By selecting and combining different modules, the multi-configuration modular computer can be configured to be a LCD display monitor, a pen-based computer, a terminal, a network personal computer, a sub-notebook computer, a notebook computer or a desktop computer.

8 Claims, 7 Drawing Sheets

MULTI-CONFIGURATION MODULAR COMPUTER

BACKGROUND OF THE INVENTION

1. Field of the Invention

The present invention relates to the field of a personal computer; more particularly, the present invention relates to a modular computer that can be configured to be different types of personal computers or associated computer devices.

2. Description of Related Art

Generally, the types of personal computers can be classified into desktop personal computers, notebook personal computers, pen-based personal computers, etc. Each type of personal computers has its own advantages but may suffer some disadvantages. For example, a desktop personal computer is easy to upgrade but inconvenient in carrying form place to place. On the contrary, a notebook personal computer is designed for high portability but suffers in upgrading. As a result, users have to purchase different types of personal computers for different purposes. Therefore, there has been a long and unfulfilled need for users to have a personal computer that satisfies all kinks of requirements.

SUMMARY OF THE INVENTION

The general objective of the present invention is to provide a multi-configuration modular personal computer that can be configured to be different types of personal computers or associated computer devices thereby eliminating the need to purchase different types of personal computers for different purposes. By changing the modules, it can easily achieve the purpose of upgrading computer.

The multi-configuration modular computer comprises a display module, a keyboard and pointer device module, a motherboard and power module, a mass-storage module, and an expansion module. By selecting and combining different modules, it is possible to provide different types of personal computers or associated computer devices.

Other objectives, advantages, and novel features of the invention will become more apparent from the following detailed description when taken in conjunction with the accompanying drawings.

DETAILED DESCRIPTION OF PREFERRED EMBODIMENT

Figure 1:
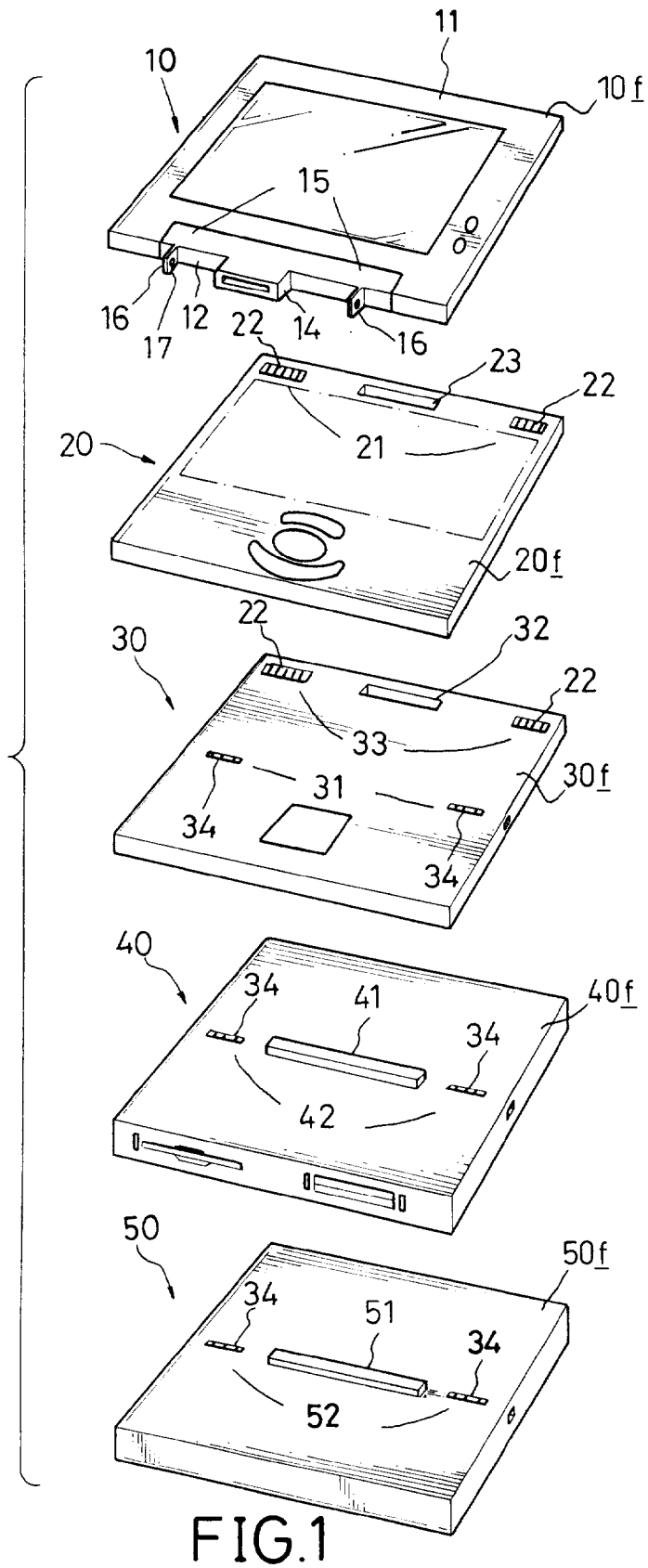
FIG. 1 is an exploded view of a preferred embodiment in accordance with the present invention.
Figure 2:
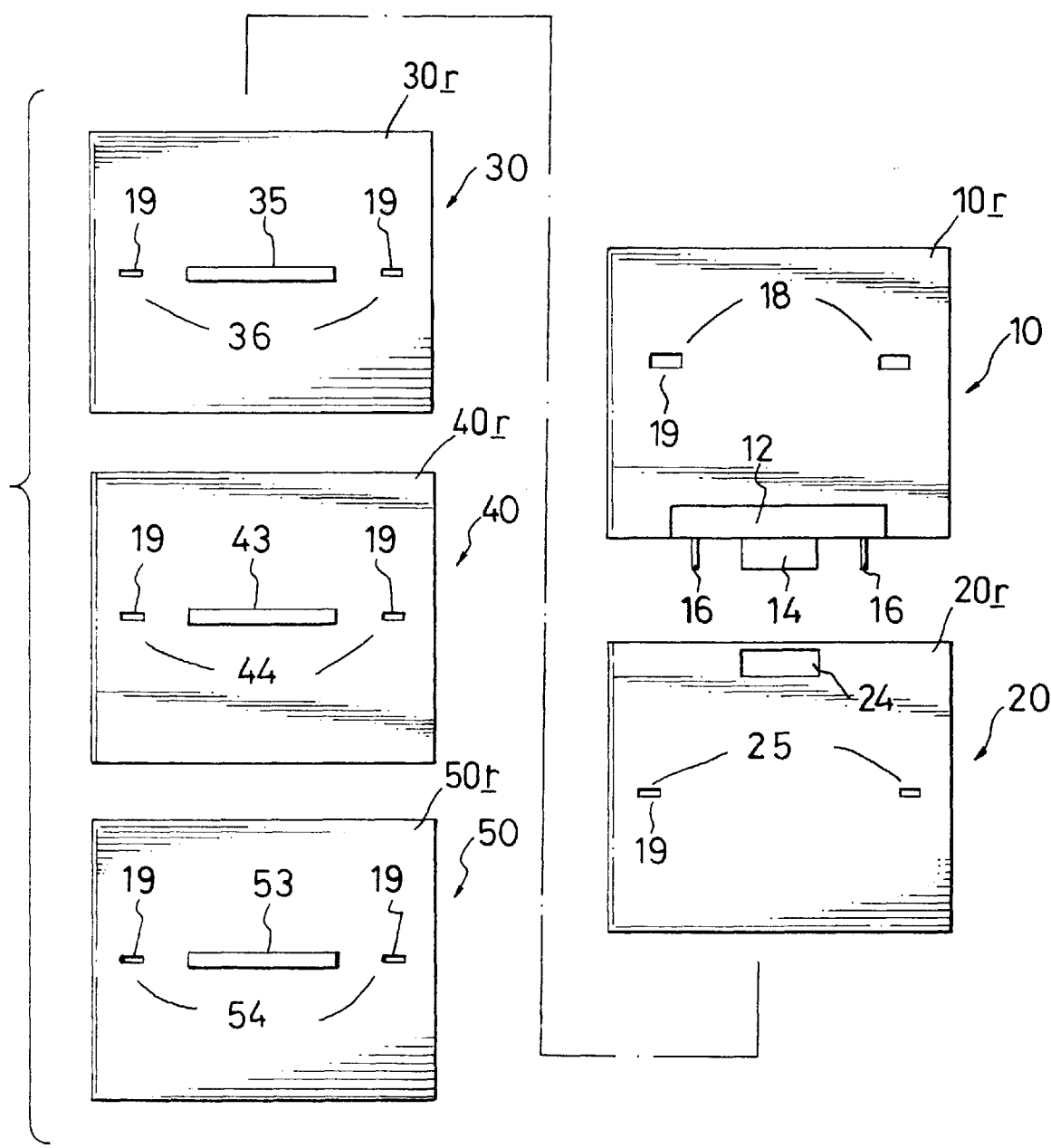
FIG. 2 is a rear view of the preferred embodiment in FIG. 1.

Referring to FIG. 1 and FIG. 2, a preferred embodiment of the present invention comprises a display module 10, a keyboard and pointer device module 20, a motherboard and power module 40, and an expansion module 50. The motherboard and power module 30 are used for controlling and powering up the modular computer. Generally, the shape of a module is preferably to be a flat box-like hexahedron formed by a front wall 10f, 20f, 30f, 40f, 50f a rear wall 10r, 20r, 30r, 40r, 50r opposed to the front wall, and four side walls. The specification of the length, width and other exterior characteristics for each module is determined so that a module may be readily mounted with another module.

Figure 4:
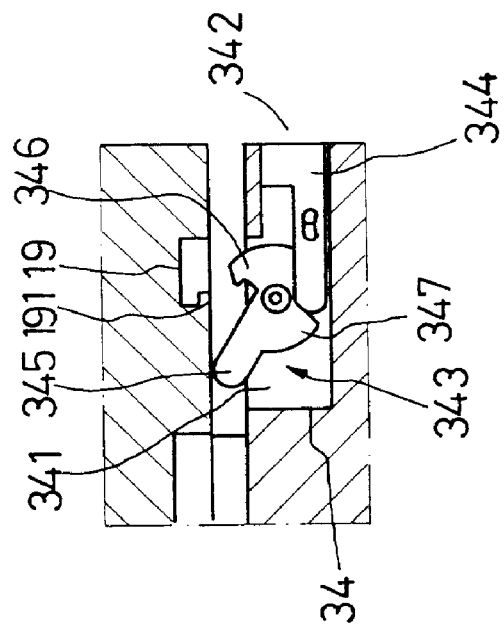
FIG. 4 is a cross-sectional view illustrating that hooking means is secured to hooking slot of the preferred embodiment in accordance with the present invention.
Figure 3:
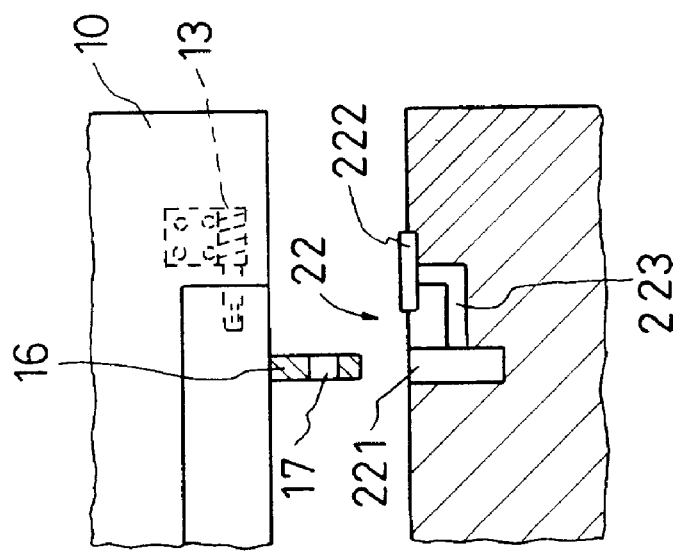
FIG. 3 is a cross-sectional view illustrating that a inserting piece is secured to a receiving means of the preferred embodiment in accordance with the present invention.

The display module 10 has a LCD display 11 and a pivotal portion 12 provided below the LCD display 11. The shape of the pivotal portion 12 is preferably to be a long hexahedron. Further referring to FIG. 3, two hinges 13 are provided respectively at two ends of the pivotal portion 12 for rotatably fixing the pivotal portion 12 to the LCD display 11 whereby the LCD display 11 is able to pivot about the pivotal portion 12. A first connector 14 and a first fix unit 15 are mounted on a bottom face of the pivotal portion 12. The first fix unit 15 includes two inserting pieces 16 located adjacent two ends of the first connector 14 respectively and a through hole 17 is defined in each inserting piece 16. Further referring to FIG. 2, moreover, a first joint unit 18 is provided at the rear wall 10r of the display module 10. The first joint unit 18 preferably defines two hooking slots 19 with proper distance. A hooking protrusion 191 projecting form an inner face of the hooking slot 19 is provided for each hooking slot 19 as shown in FIG. 4.

The keyboard and pointer device module 20 is equipped with input devices such as the keyboard, touch pad or trackball for inputting instructions to the modular computer. There are a second connector 23 and a second fix unit 21 on a front wall 20f of the keyboard and pointer device module 20. The second connector 23 is adapted for electrically connecting with the first connector 14. The second fix unit 21 includes two receiving means 22 located adjacent two ends of the second connector 21 respectively. The second connector 23 and the second fix unit 21 are corresponding to the first connector 14 and the first fix unit 16 respectively. Referring again to FIG. 3, each receiving means 22 defines a slot 221 for receiving said inserting piece 16. The receiving means 22 further has a pushing rod 222 and an inserting pin 223 connected with and driven by the pushing rod 222 whereby the inserting pin 223 extends through the through hole 17 of the inserting piece 16 when the pushing rod 222 is pushed by the display module 10 mounted to the keyboard and pointer device module 20. Consequently, the display module 10 and the keyboard and pointer device module 20 can be combined together and signals can be transmitted therebetween through the first connector 14 and the second connector 23. Further referring to FIG. 2, on a rear wall 20r of the keyboard and pointer device module 20, a third connector 24 and a second joint unit 25 are provided. The structure of the second joint unit 22 is the same as that of the first joint unit 18; that is, the second joint unit 22 defines two hooking slots 19 adjacent two sides of the third connector 24 respectively.

The motherboard and power module 30 is provided for controlling and powering up the modular computer. There are a fourth connector 32, a third fix unit 33 and a third joint unit 31 provided on a front wall 30f of the motherboard and power module 30. The fourth connector 32 is adapted for electrically connecting with other connectors such as the first connector 14 or the third connector 24 to transmit signals therebetween. The structure of the third fix unit 33 is the same as that of the second fix unit 21; that is, the third fix unit 33 includes two receiving means 22 adjacent two ends of the fourth connector 31 respectively and is adapted for connecting with the first fix unit 15. The third joint unit 31 includes two hooking means 34 positioned respectively at two sides of the motherboard and power module 30 and is adapted for connecting with other joint unit such as the first joint unit 18 or the second joint unit 25. Referring again to FIG. 4, each hooking means 34 has a first aperture 341 defined in a front wall 30f of the motherboard and power module 30, a second aperture 342 defined in a side wall of the motherboard and power module 30 and communicating with the first aperture 341, a hooking body 343 positioned pivotally in the first aperture 341, and a button piece 344 positioned movably in the second aperture 342 and contacted against said hooking body 343 so that when a lifting rod 345 of the hooking body 343 is depressed by a module such as the keyboard and pointer module 20 mounted to the motherboard and power module 30, a hooking leg 346 of the hooking body 343 hooks on the hooking protrusion 191 in the hooking slot 19 of the keyboard and pointer device module 20 thereby securely combining the keyboard and pointer device module 20 and the motherboard and power module. When the button piece 344 is depressed, the lifting rod 345 of the hooking body 343 is lifted and the hooking leg 346 of the hooking body 343 is released from the hooking slot 19 of the keyboard and pointer device module 20 thereby separating the keyboard and pointer device module 20 from the motherboard and power module 30. On a rear wall 30r of the motherboard and power module 30, a fifth connector 35 and a fourth joint unit 36 are provided. The structure of the fourth joint unit 36 is the same as that of the first joint unit 18; that is, the fourth joint unit 36 defines two hooking slots 19 adjacent two ends of the fifth connector 35 respectively.

The mass storage module 40 is equipped with storage device such as the hard disk, floppy disk and CD-ROM for providing data storage capability to the computer. There are a sixth connector 41 and a fifth joint unit 42 provided on a front wall 40f of the mass storage module 40. The sixth connector 41 is adapted for connecting with other connector such as the fifth connector 35 to transmit signals therebetween. The structure of the fifth joint unit 42 is the same as that of the third joint unit 31; that is, the fifth joint unit 42 includes two hooking means 34 adjacent two ends of the sixth connector 41 respectively and is adapted for connecting with other joint unit such as the fourth joint unit 36. On a rear wall 40r of the mass storage module 40, a seventh connector 43 and a sixth joint unit 44 are provided. The structure of the sixth joint unit 44 is the same as that of the first joint unit 18; that is, the sixth joint unit 44 defines two hooking slots 19 adjacent two ends of the seventh connector 43 respectively.

Referring to FIG. 1 and FIG. 2, an expansion module 50 is provided for expanding features of the computer by providing standard ISA and PCI expanding slots for inserting various kinds of interface cards. There are an eighth connector 51 and a seventh joint unit 52 provided on a front wall 50f of the expansion module 50. The eighth connector 51 is adapted for connecting with other connector such as the fifth connector 35 or the seventh connector 43 to transmit signals therebetween. The structure of the seventh joint unit 52 is the same as that of the third joint unit 31; that is, the seventh joint unit 52 includes two hooking means 34 adjacent two ends of the eighth connector 51 respectively and is adapted for connecting with other joint unit such the fourth joint unit 36 or the sixth joint 44. On a rear wall 50r of the expansion module 50, a ninth connector 53 and an eighth joint unit 54 are provided. The structure of the eighth joint unit 54 is the same as that of the first joint unit 18; that is, the eighth joint unit 54 defines two hooking slots 19 adjacent two sides of the ninth connector 53 respectively.

The first to ninth connectors 14,23,24,32,35,41,43,51,53 provide the capability of transmitting standard industry signals, like ISA and PCI slots signals, among various modules. Preferably, the first connector 14 and the third connector 24 are male connectors that transmit display signals. The second connector 23 and the fourth connector 32 are female connectors. The fifth connector 35, the seventh connector 43 and the ninth connector 53 are female connectors. The sixth connector 41 and the eighth connector 51 are male connectors.

Figure 6:
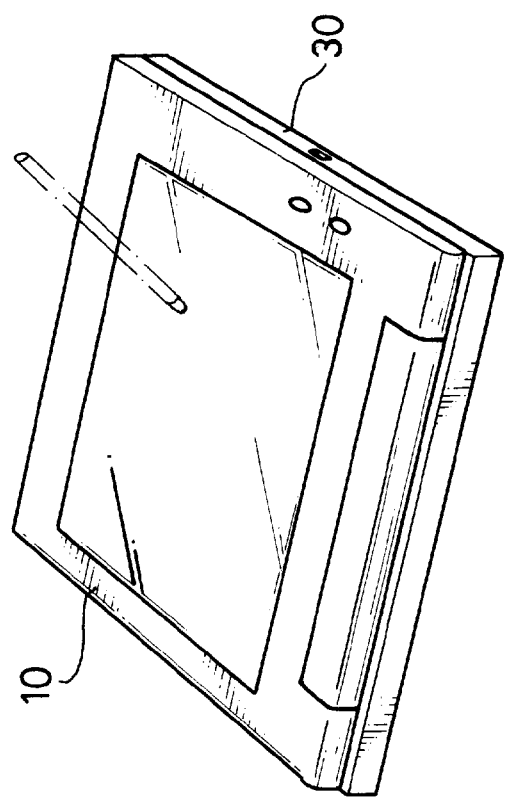
FIG. 6 shows that the preferred embodiment is configured to be a pen-based computer.
Figure 5:
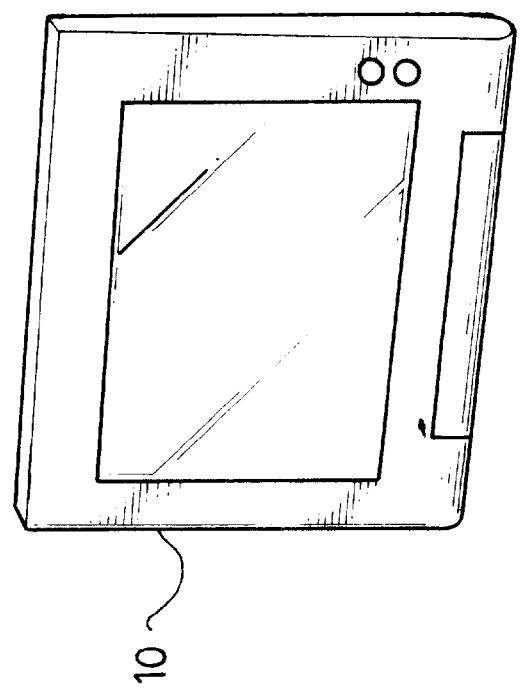
FIG. 5 shows that the preferred embodiment is configured to be a LCD display monitor.
Figure 8:
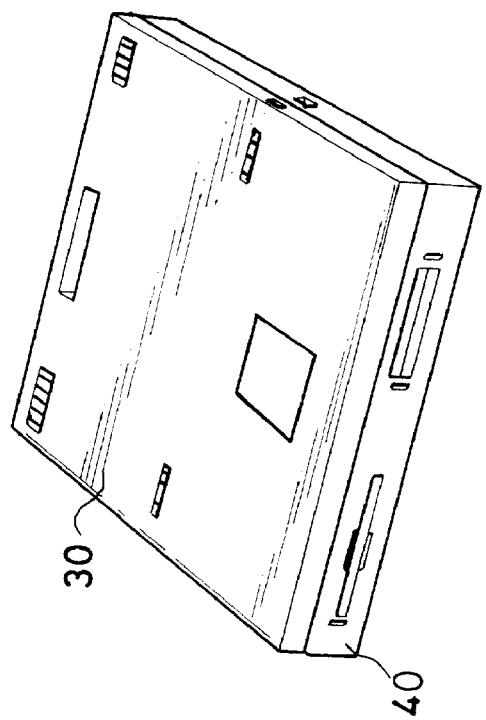
FIG. 8 shows that the preferred embodiment is configured to be a network personal computer.
Figure 7:
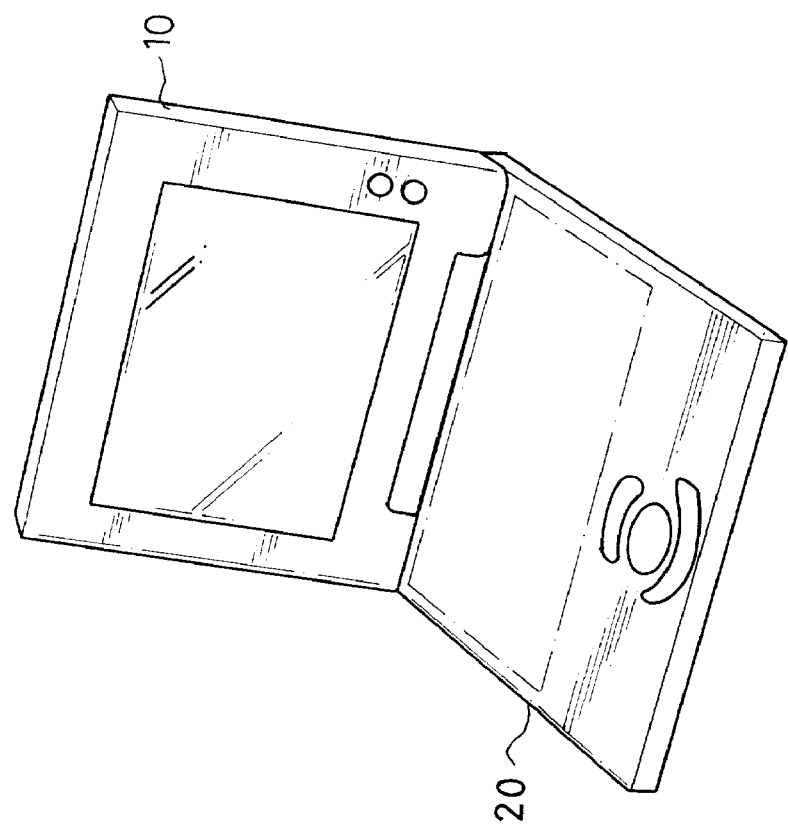
FIG. 7 shows that the preferred embodiment is configured to be a terminal.
Figure 10:
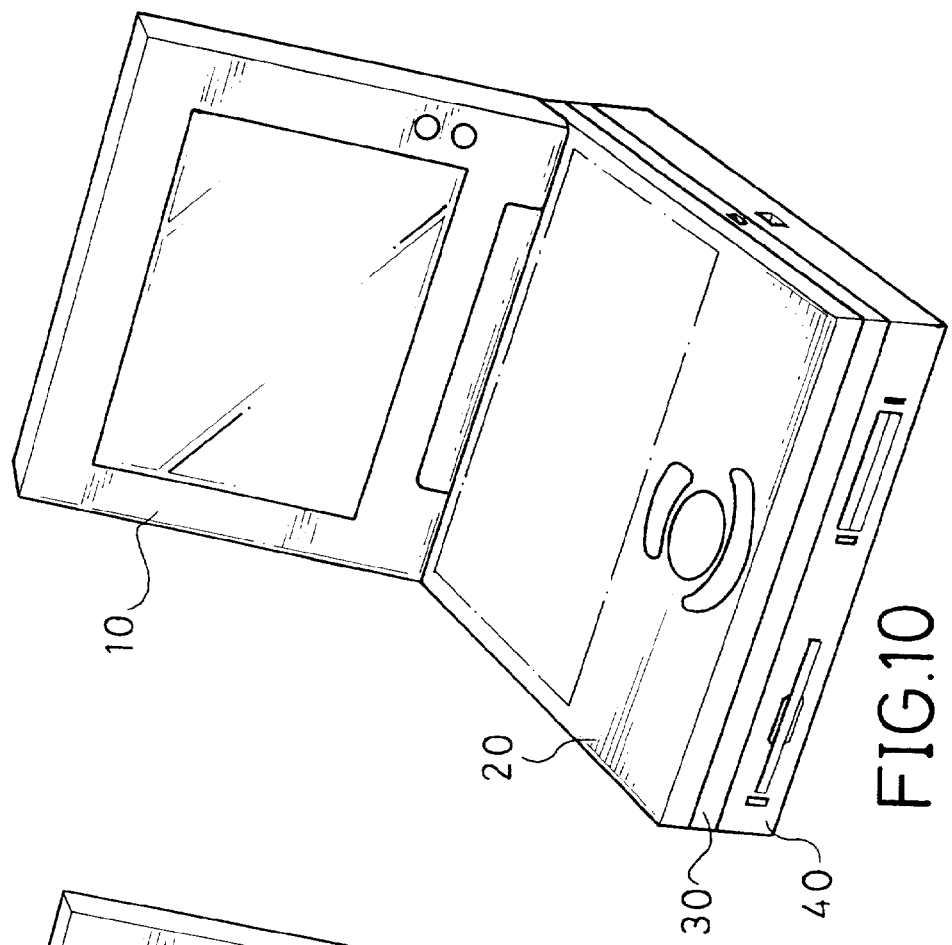
FIG. 10 shows that the preferred embodiment is configured to be a notebook computer.
Figure 9:
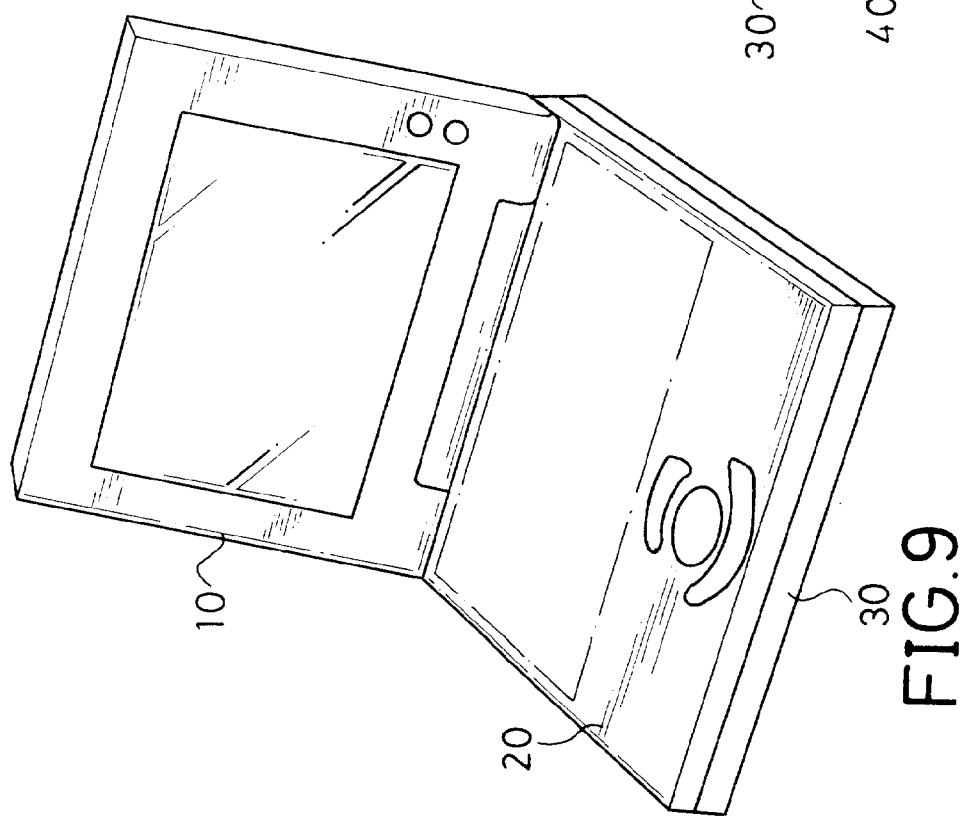
FIG. 9 shows that the preferred embodiment is configured to be a sub-notebook computer.
Figure 11:
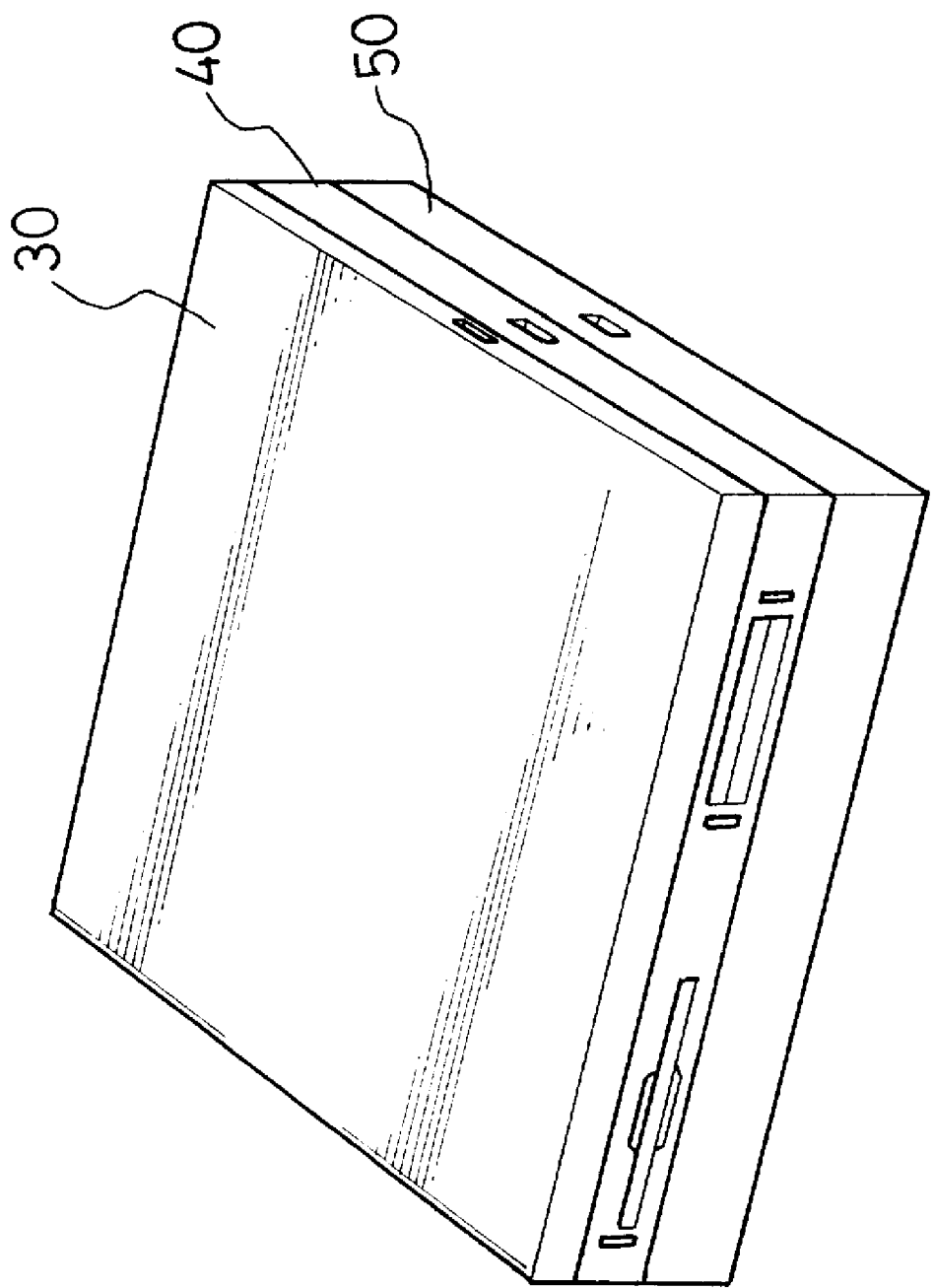
FIG. 11 shows that the preferred embodiment is configured to be a desktop computer.

The multi-configuration modular computer according to the present invention can be configured to be different types of personal computers or associated computer devices. FIG. 5 shows that it is configured to be a LCD display monitor by simply providing the display module 10. FIG. 6 shows that it is configured to be a pen-based computer by combining the display module 10 and the motherboard and power module 30. FIG. 7 shows that it is configured to be a terminal by combining the display module 10 and the keyboard and pointer device module 20. FIG. 8 shows that it is configured to be a network personal computer by combining the motherboard and power module 30 and the mass storage module 40. FIG. 9 shows that it is configured to be a sub-notebook computer by combining the display module 10, the keyboard and pointer device module 20, and the motherboard and power module 30. FIG. 10 shows it is configured to be a notebook computer by combining the display module 10, the keyboard and pointer device module 20, the motherboard and power module 30, and the mass storage module 40. FIG. 11 shows that it is configured to be a desktop computer by combining the motherboard and power module 30, the mass storage module 40, and the expansion module 50.

Although the present invention has been explained in relation to its preferred embodiment, it is to be understood that many other possible modifications and variations can be made without departing from the spirit and scope of the invention as hereinafter claimed.

What is claimed is:

1. A multi-configuration modular computer comprising:
   a display module having a LCD display, a first connector and a first fix unit both provided below said LCD display, and a first joint unit provided at a rear wall thereof;
   a keyboard and pointer device module having a front wall and a rear wall, said front wall having a second connector for coupling to said first connector and a second fix unit for connecting with said first fix unit, said rear wall having a third connector and a second joint unit;
   a motherboard and power module having a front wall and a rear wall, said front wall having a fourth connector for connecting with said first or third connector to transmit standard ISA and PCI slots signals therebetween, a third fix unit for connecting with said first fix unit, and a third joint unit for connecting with said first or second joint unit, said rear wall having a fifth connector and a fourth joint unit;

a mass storage module having a front wall and a rear wall, said front wall having a sixth connector for connecting with said fifth connector to transmit signals therebetween and a fifth joint unit for connecting with said fourth joint unit, said rear wall having a seventh connector and a sixth joint unit; and an expansion module having a front wall and a rear wall, said front wall having an eighth connector for connecting with said fifth or seventh connector to transmit signals therebetween and a seventh joint unit for connecting with said fourth or sixth joint unit, said rear wall having a ninth connector and a eighth joint unit;

wherein said first connector and said first fix unit are mounted on a bottom face of said pivotal portion.

2. The multi-configuration modular computer as claimed in claim 1, wherein said first fix unit includes two inserting pieces located adjacent two ends of said first connector respectively, each inserting piece having a through hole defined therein.

3. The multi-configuration modular computer as claimed in claim 2, wherein said first joint unit of said display module defines two hooking slot, each has a hooking protrusion projecting from an inner face thereof.

4. The multi-configuration modular computer as claimed in claim 3, wherein said second fix unit includes two receiving means located adjacent two ends of said second connector respectively, each receiving means defines a slot for receiving said inserting piece and has a pushing rod and an inserting pin connected with and driven by said pushing rod whereby said inserting pin extends through said through hole of said inserting piece when said pushing rod is pushed, and wherein the structure of said second joint unit is the same as that of said first joint unit.

5. The multi-configuration modular computer as claimed in claim 4, wherein said third joint unit includes two hooking means, and wherein structures of said third fix unit and said fourth joint unit are the same as those of said second fix unit said first joint unit respectively.

6. The multi-configuration modular computer as claimed in claim 5, wherein each said hooking means of said motherboard and power module has a first aperture defined in said front wall of said motherboard and power module, a second aperture defined in a side wall of said motherboard and power module and communicating with said first aperture, a hooking body positioned pivotally in said first aperture, and a button piece positioned movably in said second aperture and contacted against said hooking body so that when a lifting rod of said hooking body is pressed, a hooking leg of said hooking body hooks on said protrusion block in said hooking slot, and when said button piece is depressed, said lifting rod of said hooking body is lifted and said hooking leg of said hooking body is released from said protrusion block of said hooking slot.

7. The multi-configuration modular computer as claimed in claim 6, wherein the structure of said fifth joint unit is the same as that of said third joint unit and wherein the structure of said sixth joint unit is the same as that of said first joint unit.

8. The multi-configuration modular computer as claimed in claim 6, wherein the structure of said seventh joint is the same as that of said third joint unit and wherein the structure of said eighth joint unit is the same as that of said first joint unit.

* * * * *